(12) United States Patent
Morishima

(10) Patent No.: US 6,770,347 B2
(45) Date of Patent: Aug. 3, 2004

(54) CYANINE DYE COMPOUND HAVING TETRACYANOQUINODIMETHANE COMPOUND AS COUNTER ANION AND OPTICAL RECORDING MEDIUM CONTAINING THE SAME

(75) Inventor: Shinnichi Morishima, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/188,055

(22) Filed: Jul. 3, 2002

(65) Prior Publication Data

US 2003/0113505 A1 Jun. 19, 2003

(30) Foreign Application Priority Data

Jul. 6, 2001 (JP) ..................................... P.2001-206781

(51) Int. Cl.$^7$ ................................................. B32B 3/02
(52) U.S. Cl. .................... 428/64.1; 428/64.4; 428/64.8; 430/270.2
(58) Field of Search ............................... 428/64.1, 64.4, 428/64.8, 913; 432/270.14, 270.19, 270.2, 495.1, 945

(56) References Cited

U.S. PATENT DOCUMENTS

| | | | | |
|---|---|---|---|---|
| 5,579,150 A | * | 11/1996 | Cho | 359/241 |
| 5,998,094 A | * | 12/1999 | Ishida | 430/270.19 |
| 6,203,876 B1 | * | 3/2001 | Morishima | 428/64.1 |
| 6,525,181 B2 | * | 2/2003 | Kasada | 534/707 |
| 2002/0025491 A1 | * | 2/2002 | Morishima | 430/270.19 |
| 2003/0138729 A1 | * | 7/2003 | Liao | 430/270.19 |

FOREIGN PATENT DOCUMENTS

| | | |
|---|---|---|
| JP | 10-181211 | 7/1998 |
| JP | 10-226710 | 8/1998 |

* cited by examiner

*Primary Examiner*—Elizabeth Mulvaney
(74) *Attorney, Agent, or Firm*—Sughrue Mion, PLLC

(57) ABSTRACT

A cyanine dye compound represented by formula (I) shown below, and an optical recording medium having a recording layer which is capable of recording information by laser irradiation and contains the cyanine dye compound.

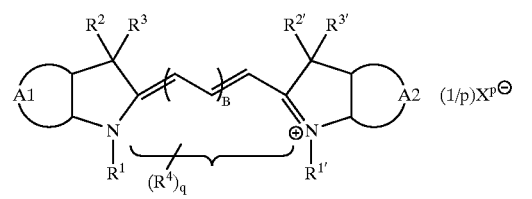

(I)

In formula (I), $X^{p-}$ represents a p-valent anionic tetracyanoquinodimethane compound represented by formula (II):

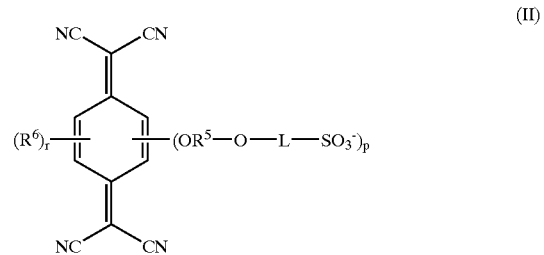

(II)

The other symbols in the formulas are defined in the specification.

4 Claims, No Drawings

CYANINE DYE COMPOUND HAVING TETRACYANOQUINODIMETHANE COMPOUND AS COUNTER ANION AND OPTICAL RECORDING MEDIUM CONTAINING THE SAME

FIELD OF THE INVENTION

This invention relates to an optical recording medium capable of recording information by laser irradiation and to a cyanine dye compound having a specific structure which is useful to make the optical recording medium.

BACKGROUND OF THE INVENTION

Optical recording discs recordable once with laser light are well known as CD-Rs. Compared with traditional CDs which have pits formed on the substrate by injection molding to record information, CD-Rs are advantageous in that CDs can be produced on a small scale at a reasonable cost and rapidly. The demand for CD-Rs has been increasing with the recent spread of personal computers.

CD-R type recording media typically comprise a transparent disc substrate, a recording layer made of an organic dye (dye recording layer), a reflective layer made of metal (e.g., gold or silver), and a resin protective layer in this order. Writing to an optical disc is carried out by irradiating the optical disc with a laser beam of the near infrared region (usually around 780 nm). The irradiated part of the dye recording layer absorbs the light to generate heat and is thermally deformed (e.g., to form pits) to record the information. The recorded information is reproduced generally by irradiating the optical disc with a laser beam having the same wavelength as the writing beam to detect reflectance difference between the recorded area (the area where the dye recording layer has been thermally deformed) and the non-recorded area (the area where the dye recording layer has not been deformed).

In recent years optical discs called recordable digital versatile discs (DVD-Rs) which are capable of higher density recording than CD-Rs have been proposed. It is known the theory that converging a laser beam diameter is effective to increase recording density and that laser light of shorter wavelength is advantageous for achieving high-density recording because of capability of being converged to a smaller spot size. Based on this principle, DVD-Rs have achieved higher density recording by using visible laser beams (having wavelengths usually ranging 630 to 680 nm), which are shorter than those used for CD-Rs (about 780 nm).

The key to realization of high-density recording to an optical recording medium having a dye recording layer is development of a dye compound possessing excellent recording and reading sensitivity with respect to shorter wavelength light. The present applicant has proposed a DVD-R type recording medium having a cyanine dye-containing recording layer on a substrate in JP-A-10-226170 (The term "JP-A" as used herein means an "unexamined published Japanese patent application"). In addition, JP-A-10-181211 discloses trimethinecyanine dyes. Some of this type of cyanine dyes exhibit excellent recording characteristics for laser light of 630 to 680 nm and are promising as a recording dye for high-density recording media.

With the recent broadening of application of CD-Rs and DVD-Rs, the demand for performance stability of optical discs has been getting strict for use under severe environmental conditions, such as considerably varying humidity and temperature conditions. To meet the demand, a dye compound superior to those of JP-A-10-226170 and JP-A-10-181211 in resistance to light and to heat and humidity has been sought for.

SUMMARY OF THE INVENTION

In view of the above-described circumstances, an object of the present invention is to provide a cyanine dye compound which has excellent resistance to light and to heat and humidity and is suitable for use as a recording layer dye of an optical recording medium.

Another object of the invention is to provide a recordable optical recording medium capable of recording and reproducing information by laser irradiation, which has provided with a dye recording layer containing the cyanine dye compound so as to be excellent in recording and reading performance and storage properties such as light resistance and durability.

Other objects and effects of the invention will become apparent from the following description.

The above-described objects of the present invention have been achieved by providing:

(1) A cyanine dye compound represented by formula (I):

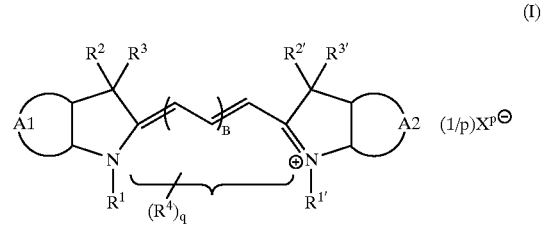

wherein A1 and A2 each independently represent a benzene ring or a naphthalene ring; $R^1$, $R^{1'}$, $R^2$, $R^{2'}$, $R^3$ and $R^{3'}$ each independently represent a substituted or unsubstituted alkyl group, provided that at least one of $R^1$ and $R^{1'}$ represents an alkyl group substituted with a hydroxyl group or an alkoxyl group having 1 to 6 carbon atoms; $R^4$ represents a substituent on the methine chain; q represents an integer of 0 or greater; p represents an integer of 1 to 4; B represents 0, 1 or 2; and $X^{p-}$ represents a p-valent anionic tetracyanoquinodimethane compound represented by formula (II):

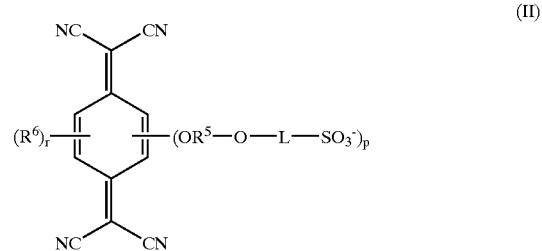

wherein $R^5$ represents a substituted or unsubstituted alkylene group; L represents a single bond or a divalent linking group; $R^6$ represents a substituent; p is as defined above; and r is an integer of 0 to 3; and (2) An optical recording medium comprising a substrate having provided thereon a recording layer capable of recording information by laser irradiation, wherein said recording layer contains a cyanine dye compound represented by formula (I).

The cyanine dye compound of the present invention exhibits excellent resistance to light and to heat and humidity. The optical recording medium of the present invention which contains the cyanine dye compound in the dye recording layer is excellent in recording and reading performance and storage properties such as resistance to light and to heat and humidity.

DETAILED DESCRIPTION OF THE INVENTION

In formula (I), the benzene or naphthalene ring as A1 and A2 is represented by any one of formulae (III) to (VI):

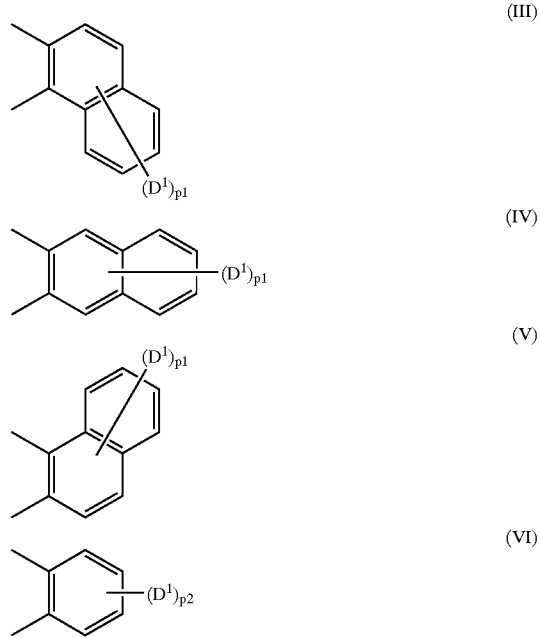

wherein $D^1$ represents a substituent on the benzene or naphthalene ring; p1 represents an integer of 0 to 6; and p2 represents an integer of 0 to 4.

The substituent $D^1$ includes an acyclic or cyclic alkyl group having 1 to 20 carbon atoms (e.g., methyl, ethyl, n-propyl, isopropyl or n-butyl), a substituted or unsubstituted aryl group having 6 to 18 carbon atoms (e.g., phenyl, chlorophenyl, anisyl, toluyl, 2,4-di-t-amyl or 1-naphthyl), an alkenyl group having 2 to 20 carbon atoms (e.g., vinyl or 2-methylvinyl), an alkynyl group having 2 to 20 carbon atoms (e.g., ethynyl, 2-methylethynyl or 2-phenylethynyl), a halogen atom (e.g., F, Cl, Br or I), a cyano group, a hydroxyl group, a carboxyl group, an acyl group having 2 to 20 carbon atoms (e.g., acetyl, benzoyl, salicyloyl or pivaroyl), an alkoxyl group having 1 to 20 carbon atoms (e.g., methoxy, butoxy or cyclohexyloxy), an aryloxy group having 6 to 18 carbon atoms (e.g., phenoxy or 1-naphthoxy), an alkylthio group having 1 to 20 carbon atoms (e.g., methylthio, butylthio, benzylthio or 3-methoxypropylthio), an arylthio group having 6 to 18 carbon atoms (e.g., phenylthio or 4-chlorophenylthio), an alkylsulfonyl group (e.g., methanesulfonyl or butanesulfonyl), an arylsulfonyl group (e.g., benzenesulfonyl or p-toluenesulfonyl), a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group such as an aromatic heterocyclic group (e.g., pyridyl, thienyl, furyl, thiazolyl, imidazolyl, pyrazolyl, benzoxazolyl or benzothiazolyl) or an aliphatic heterocyclic group (e.g., pyrrolidine, piperidine, morpholine, pyran, thiopyran, dioxane or dithiolane).

The substituent $D^1$ is preferably selected from an alkyl group having 1 to 6 carbon atoms (especially methyl), an aryl group having 6 to 10 carbon atoms (especially phenyl), an alkoxyl group having 1 to 10 carbon atoms (especially methoxy), a hydroxyl group, and a halogen atom (especially Cl). The substituent $D^1$ is still preferably a methyl group, a phenyl group, a hydroxyl group, a methoxy group or a chlorine atom. p1 and p2, which range 0 to 6 and 0 to 4, respectively, each preferably represent 0 or 1, particularly 0. Where two or more substituents $D^1$ are present in the dye compound, the substituents may be the same or different.

$R^1$, $R^{1'}$, $R^2$, $R^{2'}$, $R^3$, and $R^{3'}$ in formula (I) each independently represent a substituted or unsubstituted alkyl group. The substituent of the substituted alkyl group includes those recited as $D^1$. Preferred of them are a phenyl group, a cyano group, a hydroxyl group and an alkoxyl group. The alkyl group as $R^1$ and $R^{1'}$ is preferably one having 1 to 18 carbon atoms, particularly 1 to 4 carbon atoms. The alkyl group as $R^2$, $R_{2'}$, $R^3$, and $R^{3'}$ is preferably one having 1 to 18 carbon atoms, particularly one having 1 to 4 carbon atoms, especially a methyl group. At least one of $R^1$ and $R^{1'}$ represents an alkyl group substituted with a hydroxyl group or an alkoxyl group having 1 to 6 carbon atoms. It is preferred for at least one of $R^1$ and $R^{1'}$ to represent a hydroxyalkyl group having 1 to 4 carbon atoms.

It is preferred that $R^2$ be equal to $R^{2'}$ and that $R^3$ be equal to $R^{3'}$.

The substituent $R^4$ includes those enumerated above as the examples of the substituent $D^1$. $R^4$ preferably represents an alkyl group having 1 to 6 carbon atoms (especially methyl), an aryl group having 6 to 10 carbon atoms (especially phenyl), an alkoxyl group having 1 to 10 carbon atoms (especially methoxy) or a halogen atom (especially Cl). $R^4$ is still preferably a methyl group, a phenyl group or a chlorine atom. q, which represents an integer of 0 to 5, is preferably 0 or 1, particularly 0. B is 0, 1 or 2.

Next, $X^{p-}$ in formula (I) is illustrated in detail below. $X^{p-}$ is a p-valent anionic tetracyanoquinodimethane compound of formula (II).

In formula (II), the alkylene group as represented by $R^5$ is preferably an acyclic or cyclic alkylene group having 1 to 20 carbon atoms (e.g., methylene, ethylene, n-propylene, isopropylene or n-butylene), still preferably an alkylene group having 1 to 6 carbon atoms. The alkylene group as $R^5$ may be substituted or unsubstituted.

The substituent which can be on the alkylene group $R^5$ includes an acyclic or cyclic alkyl group having 1 to 20 carbon atoms (e.g., methyl, ethyl, n-propyl, isopropyl or n-butyl), a substituted or unsubstituted aryl group having 6 to 18 carbon atoms (e.g., phenyl, chlorophenyl, anisyl, toluyl, 2,4-di-t-amyl or 1-naphthyl), an alkenyl group (e.g., vinyl or 2-methylvinyl), an alkynyl group (e.g., ethynyl, 2-methylethynyl or 2-phenylethynyl), a halogen atom (e.g., F, Cl, Br or I), a cyano group, a hydroxyl group, a carboxyl group, a sulfo group, an acyl group (e.g., acetyl, benzoyl, salicyloyl or pivaroyl), an alkoxyl group (e.g., methoxy, butoxy, cyclohexyloxy, 2-hydroxyethoxy, 2-carboxyethoxy, 2-methoxyethoxy, 2-acetoxyethoxy, 2-methoxycarbonylethoxy or benzyloxy), an aryloxy group (e.g. phenoxy or 1-naphthoxy), an alkylthio group (e.g., methylthio, butylthio, benzylthio or 3-methoxypropylthio), an arylthio group (e.g., phenylthio or 4-chlorophenylthio), an alkylsulfonyl group (e.g., methanesulfonyl or butanesulfonyl), an arylsulfonyl group (e.g., benzenesulfonyl or p-toluenesulfonyl), a carbamoyl group having 1 to 10 carbon atoms, an amide group having 1 to 10 carbon atoms, an imide group having 2 to 12 carbon atoms, an acyloxy group having 2 to 10 carbon atoms, an alkoxycarbonyl group having 2 to 10 carbon atoms, and a heterocyclic group such as an aromatic heterocyclic group (e.g., pyridyl, thienyl, furyl, thiazolyl, imidazolyl or pyrazolyl) or an aliphatic heterocyclic group (e.g., pyrrolidine, piperidine, morpholine, pyran, thiopyran, dioxane or dithiolane). Preferred of these substituents are an alkyl group, an aryl group, an alkoxyl group, a hydroxyl group, an amino group, and a halogen atom. Still preferred are an alkyl group having 1 to 6 carbon atoms, an aryl group having 6 to 10 carbon atoms (especially phenyl), an alkoxyl group having 1 to 10 carbon atoms, a hydroxyl group, an amino group, and a halogen atom.

The substituent $R^6$ includes those enumerated as the examples of the substituent of the alkylene group $R^5$. The preference for the substituent of the alkylene group $R^5$ applies to $R^6$. p is 1 to 4, preferably 1 or 2, still preferably 2. r is 0 to 3, preferably 0 or 1, still preferably 0.

The divalent linking group as L includes one having 1 to 20 carbon atoms which is composed of at least one member selected from an alkylene group (e.g., methylene, ethylene, propylene, butylene or pentylene), an arylene group (e.g., phenylene or naphthylene), an alkenylene group (e.g., ethenylene or propenylene), an alkynylene group (e.g., ethynylene), an amide group, an ester group, a sulfonamide group, a sulfonic ester group, a ureido group, a sulfonyl group, a sulfinyl group, a thioether group, an ether group, a carbonyl group, a group —N(Rq)— (where Rq represents a hydrogen atom, a substituted or unsubstituted alkyl group or a substituted or unsubstituted aryl group), and a divalent heterocyclic group (e.g., 6-chloro-1,3,5-triazine-2,4-diyl, pyrimidine-2,4-diyl or quinoxaline-2,3-diyl).

A preferred linking group as L is —C(=O)—G—, where G is a divalent linking group composed of at least one of an alkylene group, an arylene group, an alkenylene group, and an alkynylene group. G is preferably a divalent linking group having 1 to 10 carbon atoms which is composed of at least one member selected from an alkylene group having 1 to 4 carbon atoms (e.g., methylene, ethylene, propylene or butylene), an arylene group having 6 to 10 carbon atoms (e.g., phenylene or naphthylene), an alkenylene group having 1 to 4 carbon atoms (e.g., ethenylene or propenylene), and an alkynylene group having 1 to 4 carbon atoms (e.g., ethynylene). G is still preferably a substituted or unsubstituted alkylene group having 1 to 4 carbon atoms or a substituted or unsubstituted phenylene group having 6 to 10 carbon atoms. G is particularly preferably an unsubstituted methylene, ethylene, propylene, butylene or phenylene group.

The divalent linking groups represented by L and G may have a substituent. The substituent includes those described as a substituent on the alkylene group represented by $R^5$. The preference of the substituent on $R^5$ also applies here.

The compound of formula (I) can be bonded at an arbitrary position to form a dimer, a trimer or a like oligomer or a polymer, in which the constituent units may be the same or different. The compound of formula (I) can be grafted to the polymer chain of polystyrene, polymethacrylate, polyvinyl alcohol, cellulose, etc.

Specific but non-limiting examples of the cyanine dye compound of formula (I) are listed below.

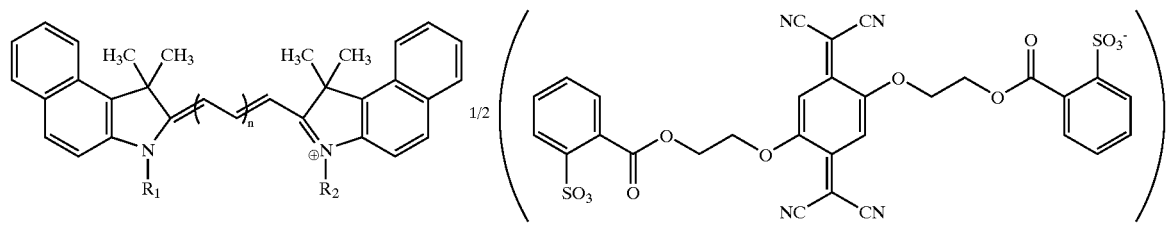

| Compound No. | n | $R_1$ | $R_2$ |
|---|---|---|---|
| I-1 | 1 | $CH_2CH_2OH$ | $CH_2CH_2OH$ |
| I-2 | 1 | $(CH_2)_3OH$ | $(CH_2)_3OH$ |
| I-3 | 1 | $(CH_2)_4OH$ | $(CH_2)_4OH$ |
| I-4 | 1 | $CH_2CH(OH)CH_3$ | $CH_2CH(OH)CH_3$ |
| I-5 | 1 | $(CH_2)_2O(CH_2)_2OH$ | $(CH_2)_2O(CH_2)_2OH$ |
| I-6 | 1 | $(CH_2)_2O(CH_2)_2O(CH_2)_2OH$ | $(CH_2)_2O(CH_2)_2O(CH_2)_2OH$ |
| I-7 | 1 | $CH_2CH(OH)CH_2OH$ | $CH_2CH(OH)CH_2OH$ |
| I-8 | 1 | $CH_3$ | $CH_2CH_2OH$ |
| I-9 | 1 | $CH_3$ | $(CH_2)_3OH$ |
| I-10 | 1 | $CH_3$ | $(CH_2)_4OH$ |
| I-11 | 1 | $CH_3$ | $CH_2CH(OH)CH_3$ |
| I-12 | 1 | $CH_3$ | $(CH_2)_2O(CH_2)_2OH$ |
| I-13 | 1 | $CH_3$ | $(CH_2)_2O(CH_2)_2O(CH_2)_2OH$ |
| I-14 | 1 | $CH_3$ | $CH_2CH(OH)CH_2OH$ |
| I-15 | 1 | $C_4H_9$ | $CH_2CH_2OH$ |
| I-16 | 1 | $C_4H_9$ | $(CH_2)_4OH$ |
| I-17 | 1 | $C_4H_9$ | $(CH_2)_2O(CH_2)_2OH$ |
| I-18 | 1 | $C_4H_9$ | $CH_2CH(OH)CH_2OH$ |
| I-19 | 1 | $CH_2OCH_3$ | $CH_2OCH_3$ |
| I-20 | 1 | $(CH_2)_2OC_2H_5$ | $(CH_2)_2OC_2H_5$ |
| I-21 | 1 | $(CH_2)_2OCH_3$ | $(CH_2)_2OCH_3$ |
| I-22 | 1 | $CH_3$ | $(CH_2)_2O(CH_2)_2OCH_3$ |
| I-23 | 1 | $CH_3$ | $CH_2OCH_3$ |
| I-24 | 1 | $CH_3$ | $(CH_2)_2OC_2H_5$ |

-continued

| | | | |
|---|---|---|---|
| I-25 | 1 | CH$_3$ | (CH$_2$)$_2$OCH$_3$ |
| I-26 | 1 | CH$_3$ | (CH$_2$)$_2$O(CH$_2$)$_2$OCH$_3$ |
| I-27 | 1 | C$_4$H$_9$ | CH$_2$OCH$_3$ |
| I-28 | 1 | C$_4$H$_9$ | (CH$_2$)$_2$OC$_2$H$_5$ |
| I-29 | 1 | C$_4$H$_9$ | (CH$_2$)$_2$OCH$_3$ |
| I-30 | 1 | C$_4$H$_9$ | (CH$_2$)$_2$O(CH$_2$)$_2$OCH$_3$ |
| I-31 | 2 | CH$_2$CH$_2$OH | CH$_2$CH$_2$OH |
| I-32 | 2 | (CH$_2$)$_2$O(CH$_2$)$_2$OH | (CH$_2$)$_2$O(CH$_2$)$_2$OH |
| I-33 | 2 | CH$_3$ | CH$_2$CH$_2$OH |
| I-34 | 2 | C$_4$H$_9$ | CH$_2$CH$_2$OH |
| I-35 | 2 | C$_4$H$_9$ | (CH2)$_4$OH |
| I-36 | 2 | CH$_2$OCH$_3$ | CH$_2$OCH$_3$ |

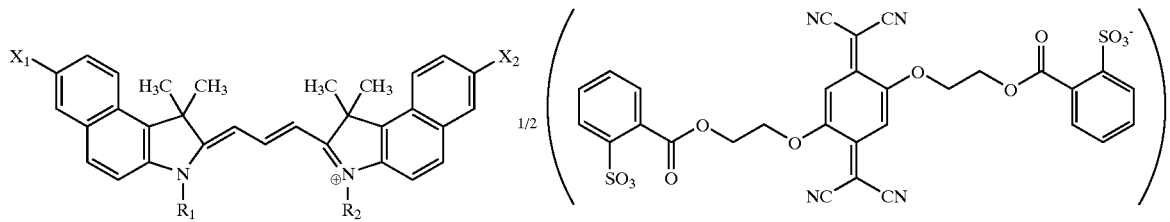

| Compound No. | R$_1$ | R$_2$ | X$_1$ | X$_2$ |
|---|---|---|---|---|
| I-37 | CH$_2$CH$_2$OH | CH$_2$CH$_2$OH | OCH$_3$ | OCH$_3$ |
| I-38 | (CH$_2$)$_3$OH | (CH$_2$)$_3$OH | OCH$_3$ | OCH$_3$ |
| I-39 | (CH$_2$)$_4$OH | (CH$_2$)$_4$OH | OCH$_3$ | OCH$_3$ |
| I-40 | CH$_2$CH(OH)CH$_3$ | CH$_2$CH(OH)CH$_3$ | OCH$_3$ | OCH$_3$ |
| I-41 | (CH$_2$)$_2$O(CH$_2$)$_2$OH | (CH$_2$)$_2$O(CH$_2$)$_2$OH | OCH$_3$ | OCH$_3$ |
| I-42 | (CH$_2$)$_2$O(CH$_2$)$_2$O(CH$_2$)$_2$OH | (CH$_2$)$_2$O(CH$_2$)$_2$O(CH$_2$)$_2$OH | OCH$_3$ | OCH$_3$ |
| I-43 | CH$_2$CH(OH)CH$_2$OH | CH$_2$CH(OH)CH$_2$OH | OCH$_3$ | OCH$_3$ |
| I-44 | CH$_3$ | CH$_2$CH$_2$OH | OCH$_3$ | OCH$_3$ |
| I-45 | CH$_3$ | (CH$_2$)$_3$OH | OCH$_3$ | OCH$_3$ |
| I-46 | CH$_3$ | (CH$_2$)$_4$OH | OCH$_3$ | OCH$_3$ |
| I-47 | CH$_3$ | CH$_2$CH(OH)CH$_3$ | OCH$_3$ | OCH$_3$ |
| I-48 | CH$_3$ | (CH$_2$)$_2$O(CH$_2$)$_2$OH | OCH$_3$ | OCH$_3$ |
| I-49 | CH$_3$ | (CH$_2$)$_2$O(CH$_2$)$_2$O(CH$_2$)$_2$OH | OCH$_3$ | OCH$_3$ |
| I-50 | CH$_3$ | CH$_2$CH(OH)CH$_2$OH | OCH$_3$ | OCH$_3$ |
| I-51 | C$_4$H$_9$ | CH$_2$CH$_2$OH | OCH$_3$ | OCH$_3$ |
| I-52 | C$_4$H$_9$ | (CH$_2$)$_4$OH | OCH$_3$ | OCH$_3$ |
| I-53 | C$_4$H$_9$ | (CH$_2$)$_2$O(CH$_2$)$_2$OH | OCH$_3$ | OCH$_3$ |
| I-54 | C$_4$H$_9$ | CH$_2$CH(OH)CH$_2$OH | OCH$_3$ | OCH$_3$ |
| I-55 | CH$_2$CH$_2$OH | CH$_2$CH$_2$OH | H | OCH$_3$ |
| I-56 | (CH$_2$)$_3$OH | (CH$_2$)$_3$OH | H | OCH$_3$ |
| I-57 | (CH$_2$)$_4$OH | (CH$_2$)$_4$OH | H | OCH$_3$ |
| I-58 | CH$_2$CH(OH)CH$_3$ | CH$_2$CH(OH)CH$_3$ | H | OCH$_3$ |
| I-59 | (CH$_2$)$_2$O(CH$_2$)$_2$OH | (CH$_2$)$_2$O(CH$_2$)$_2$OH | H | OCH$_3$ |
| I-60 | (CH$_2$)$_2$O(CH$_2$)$_2$O(CH$_2$)$_2$OH | (CH$_2$)$_2$O(CH$_2$)$_2$O(CH$_2$)$_2$OH | H | OCH$_3$ |
| I-61 | CH$_2$CH(OH)CH$_2$OH | CH$_2$CH(OH)CH$_2$OH | H | OCH$_3$ |
| I-62 | CH$_3$ | CH$_2$CH$_2$OH | OCH$_3$ | H |
| I-63 | CH$_3$ | (CH$_2$)$_3$OH | OCH$_3$ | H |
| I-64 | CH$_3$ | (CH$_2$)$_4$OH | OCH$_3$ | H |
| I-65 | CH$_3$ | CH$_2$CH(OH)CH$_3$ | OCH$_3$ | H |
| I-66 | CH$_3$ | (CH$_2$)$_2$O(CH$_2$)$_2$OH | OCH$_3$ | H |
| I-67 | CH$_3$ | (CH$_2$)$_2$O(CH$_2$)$_2$O(CH$_2$)$_2$OH | OCH$_3$ | H |
| I-68 | CH$_3$ | CH$_2$CH(OH)CH$_2$OH | OCH$_3$ | H |
| I-69 | CH$_3$ | CH$_2$CH$_2$OH | H | OCH$_3$ |
| I-70 | CH$_3$ | (CH$_2$)$_4$OH | H | OCH$_3$ |
| I-71 | CH$_3$ | (CH$_2$)$_2$O(CH$_2$)$_2$OH | H | OCH$_3$ |
| I-72 | C$_4$H$_9$ | CH$_2$CH$_2$OH | OCH$_3$ | H |
| I-73 | C$_4$H$_9$ | (CH$_2$)$_3$OH | OCH$_3$ | H |
| I-74 | C$_4$H$_9$ | (CH$_2$)$_4$OH | OCH$_3$ | H |
| I-75 | C$_4$H$_9$ | CH$_2$CH(OH)CH$_3$ | OCH$_3$ | H |
| I-76 | C$_4$H$_9$ | (CH$_2$)$_2$O(CH$_2$)$_2$OH | OCH$_3$ | H |
| I-77 | C$_4$H$_9$ | (CH$_2$)$_2$O(CH$_2$)$_2$O(CH$_2$)$_2$OH | OCH$_3$ | H |
| I-78 | C$_4$H$_9$ | CH$_2$CH(OH)CH$_2$OH | OCH$_3$ | H |
| I-79 | C$_4$H$_9$ | CH$_2$CH$_2$OH | H | OCH$_3$ |
| I-80 | C$_4$H$_9$ | (CH$_2$)$_4$OH | H | OCH$_3$ |
| I-81 | C$_4$H$_9$ | (CH$_2$)$_2$O(CH$_2$)$_2$OH | H | OCH$_3$ |
| I-82 | CH$_2$OCH$_3$ | CH$_2$OCH$_3$ | OCH$_3$ | OCH$_3$ |
| I-83 | (CH$_2$)$_2$OCH$_3$ | (CH$_2$)$_2$OCH$_3$ | OCH$_3$ | OCH$_3$ |
| I-84 | CH$_3$ | CH$_2$OCH$_3$ | OCH$_3$ | OCH$_3$ |
| I-85 | CH$_3$ | (CH$_2$)$_2$OCH$_3$ | OCH$_3$ | OCH$_3$ |
| I-86 | C$_4$H$_9$ | CH$_2$OCH$_3$ | OCH$_3$ | OCH$_3$ |
| I-87 | C$_4$H$_9$ | (CH$_2$)$_2$OCH$_3$ | OCH$_3$ | OCH$_3$ |

-continued

| | | | | |
|---|---|---|---|---|
| I-88 | $CH_3$ | $CH_2OCH_3$ | $OCH_3$ | H |
| I-89 | $CH_3$ | $(CH_2)_2OCH_3$ | $OCH_3$ | H |
| I-90 | $C_4H_9$ | $CH_2OCH_3$ | $OCH_3$ | H |
| I-91 | $C_4H_9$ | $(CH_2)_2OCH_3$ | $OCH_3$ | H |

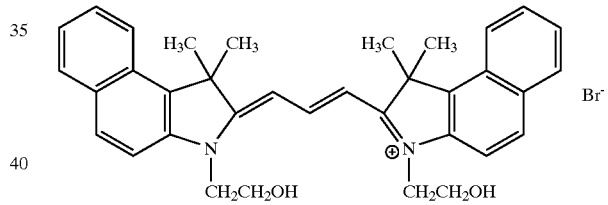

| Compound No. | $R_1$ | $R_2$ |
|---|---|---|
| I-92 | $CH_2CH_2OH$ | $CH_2CH_2OH$ |
| I-93 | $(CH_2)_3OH$ | $(CH_2)_3OH$ |
| I-94 | $(CH_2)_4OH$ | $(CH_2)_4OH$ |
| I-95 | $CH_2CH(OH)CH_3$ | $CH_2CH(OH)CH_3$ |
| I-96 | $(CH_2)_2O(CH_2)_2OH$ | $(CH_2)_2O(CH_2)_2OH$ |
| I-97 | $(CH_2)_2O(CH_2)_2O(CH_2)_2OH$ | $(CH_2)_2O(CH_2)_2O(CH_2)_2OH$ |
| I-98 | $CH_2CH(OH)CH_2OH$ | $CH_2CH(OH)CH_2OH$ |
| I-99 | $CH_2CH_2OH$ | $CH_3$ |
| I-100 | $(CH_2)_3OH$ | $CH_3$ |
| I-101 | $(CH_2)_4OH$ | $CH_3$ |
| I-102 | $CH_2CH(OH)CH_3$ | $CH_3$ |
| I-103 | $(CH_2)_2O(CH_2)_2OH$ | $CH_3$ |
| I-104 | $(CH_2)_2O(CH_2)_2O(CH_2)_2OH$ | $CH_3$ |
| I-105 | $CH_2CH(OH)CH_2OH$ | $CH_3$ |

The cyanine dye moiety of the cyanine dye compound represented by formula (I) can be synthesized according to known techniques. For example, reference can be made to it in F. M. Hamer, *Heterocyclic Compounds-Cyanine Dyes and Related Compounds,* John Wiley & Sons (1964), D. M. Sturmer, *Heterocyclic Compounds-Special Topics in Heterocyclic Chemistry,* ch. 18, sec. 14, subss. 482 to 515, John Wiley & Sons, New York, London (1977), *Rodd's Chemistry of Carbon Compounds,* 2nd Ed., vol. IV, part B, ch. 15, subss. 369 to 422, Elsevier Science Publishing Company Inc., New York (1977), and the method described in JP-A-10-226170 and the methods described in the literatures cited therein.

The tetracyanoquinodimethane represented by formula (II), which provides the anionic tetracyanoquinodimethane moiety of formula (I), can be synthesized by the process taught in JP-A-2002-128753 and the literatures cited therein. A synthesis example of the cyanine dye compounds represented by formula (I) is described below.

Synthesis of Compound I-1:

To 150 ml of methanol was added 1.79 g (3.0 mmol) of cyanine dye compound (A) shown below at room temperature followed by stirring, and a solution of 1.25 g (1.8 mmol) of tetracyanoquinodimethane (A) shown below in 150 ml of water was added thereto dropwise. The mixture was stirred at room temperature for 6 hours. The green crystals thus precipitated were collected by filtration, washed with water and methanol, and dried to give 2.6 g of the objective compound. The obtained amount corresponds to 99% of the theoretical yield.

$^1$H-NMR (DMSO-$d_6$): 8.6 (dd, 1H), 8.3 (d, 2H), 8.1 (m, 4H), 7.7–7.9 (m, 5H), 7.5 (dd, 2H), 7.2–7.4 (m, 3H), 6.5 (d, 2H), 6.4 (s, 1H), 5.1 (t, 2H), 4.5–4.7 (broad, 4H), 4.4 (t, 4H), 3.9 (dt, 4H), 2.0 (s, 12H).

Cyanine Compound (A):

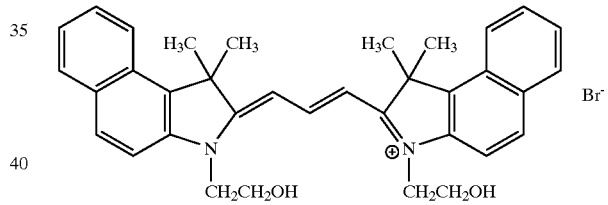

Tetracyanoquinodimethane (A) (Compound 23 Described in JP-A-2002-128753):

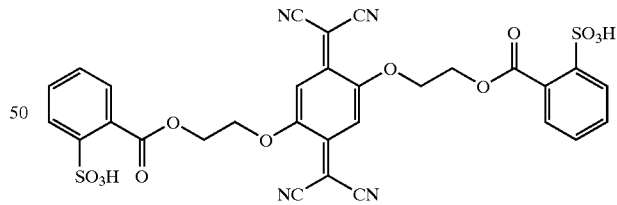

The optical recording medium according to the present invention comprises a substrate having provided thereon a recording layer containing the cyanine dye compound of formula (I). The cyanine dye compound of the invention can be advantageously used in optical recording media, such as CD-Rs and DVD-Rs.

The recording layer preferably contains various anti-discoloring agents, such as organic oxidizing agents and singlet oxygen quenchers, to have further improved light resistance.

As for the organic oxidizing agents serving as an anti-discoloring agent, the compounds disclosed in JP-A-10-151861 are preferred. The compounds represented by formula (B1) or (B2) are particularly preferred of them:

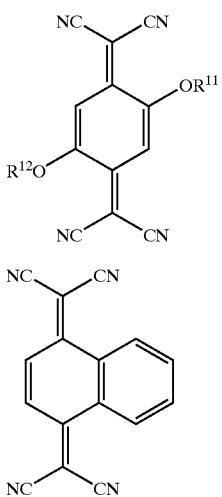

(B1)

(B2)

wherein $R^{11}$ and $R^{12}$ each independently represent a hydrocarbon group, preferably an alkyl group having 1 to 18 carbon atoms, an alkenyl group having 2 to 18 carbon atoms, an alkynyl group having 2 to 18 carbon atoms, or an aryl group having 6 to 14 carbon atoms, each of which hydrocarbon groups may have a substituent. Suitable substituents include those described as $D^1$ of formulae (III) to (VI). Preferred examples of the compounds represented by formula (B1) are:

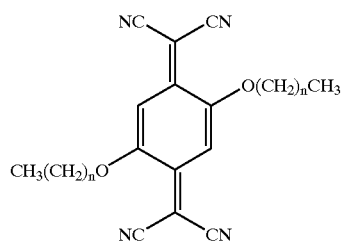

(where n=0 to 11, corresponding to B1-1 through B1-12)

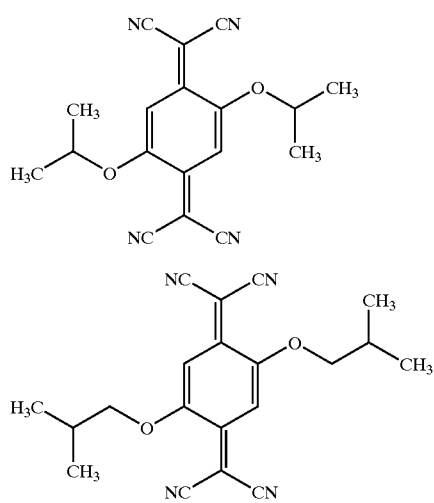

(B1-13)

(B1-14)

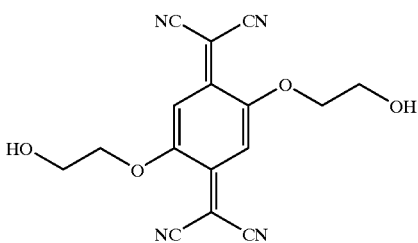

(B1-15)

The compounds of formulae (B1) and (B2) can be used either individually or as a combination of two or more thereof. The compounds of formulae (B1) and (B2) can be easily synthesized by the process described in JP-A-10-151861.

As for the singlet oxygen quenchers serving as an antidiscoloring agent, already known compounds disclosed in publications including patent specifications can be used. Specific examples thereof include those disclosed, for example, in JP-A-58-175693, JP-A-59-81194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-63-209995, JP-A-4-25492, JP-B-1-38680, JP-B-6-26028, German Patent 350399, and Nippon Kagaku Gakkaishi published by The Chemical Society of Japan, October, 1992, p. 1141. Preferred examples of the singlet oxygen quencher include compounds represented by the following formula (C):

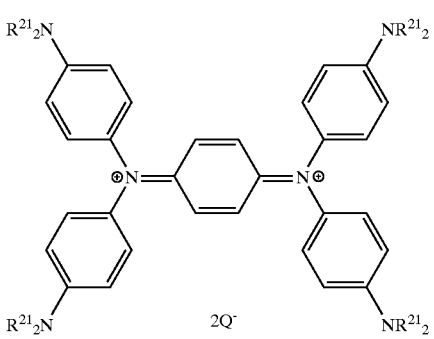

(C)

wherein $R^{21}$ represents a substituted or unsubstituted alkyl group; and $Q^-$ represents an anion.

In formula (C), $R^{21}$ is usually a substituted or unsubstituted alkyl group having 1 to 8 carbon atoms, preferably an unsubstituted alkyl group having 1 to 6 carbon atoms. Substituents which can be on the alkyl group include a halogen atom (e.g., F or Cl), an alkoxyl group (e.g., methoxy or ethoxy), an alkylthio group (e.g., methylthio or ethylthio), an acyl group (e.g., acetyl or propionyl), an acyloxy group (e.g., acetoxy or propionyloxy), a hydroxyl group, an alkoxycarbonyl group (e.g., methoxycarbonyl or ethoxycarbonyl), an alkenyl group (e.g., vinyl), and an aryl group (e.g., phenyl or naphthyl). Preferred of them are a halogen atom, an alkoxyl group, an alkylthio group, and an alkoxycarbonyl group. The anion as $Q^-$ includes $ClO_4^-$, $AsF_6^-$, $BF_4^-$, and $SbF_6^-$.

Specific examples of the compounds represented by formula (C) are listed in Table 1 below.

TABLE 1

| Compound No. | $R^{21}$ | $Q^-$ |
|---|---|---|
| C-1 | $CH_3$ | $ClO_4^-$ |
| C-2 | $C_2H_5$ | $ClO_4^-$ |
| C-3 | $n\text{-}C_3H_7$ | $ClO_4^-$ |
| C-4 | $n\text{-}C_4H_9$ | $ClO_4^-$ |
| C-5 | $n\text{-}C_5H_{11}$ | $ClO_4^-$ |
| C-6 | $n\text{-}C_4H_9$ | $SbF_6^-$ |
| C-7 | $n\text{-}C_4H_9$ | $BF_4^-$ |
| C-8 | $n\text{-}C_4H_9$ | $AsF_6^-$ |

The cyanine dye compound of formula (I) can be used either individually or as a combination of two or more thereof or as a combination with other dye compounds known effective for use as dye compounds in optical recording media. Other dye compounds that can be used in combination include cyanine dyes, oxonol dyes, pyromethene metal complexes, azo metal complexes, porphyrin dyes, phthalocyanine dyes, pyrylium dyes, thiopyrylium dyes, azulenium dyes, squarylium dyes, naphthoquinone dyes, triphenylmethane dyes, and triallylmethane dyes.

The optical recording medium of the invention for CD-R applications preferably has a constitution of: a 1.2±0.2 mm thick transparent disc substrate pregrooved with a track pitch of 1.4 to 1.8 µm; a recording layer; a light reflective layer; and a protective layer, stacked in this order. The one for DVD-R applications preferably has a constitution of: 0.6±0.1 mm thick transparent disc substrate pregrooved with a track pitch of 0.6 to 0.9 µm; a recording layer; a light reflective layer; and a protective layer, stacked in this order.

For DVD-R applications, the optical recording medium of the invention preferably embraces the following embodiments:

(1) A 1.2±0.2 mm thick optical recording medium comprising a pair of discs each having: a transparent disk substrate of 120±3 mm or 80±3 mm in diameter and 0.6±0.1 mm in thickness, pregrooved at a track pitch of 0.6 to 0.9 µm; and a recording layer containing the cyanine dye compound of formula (I), provided on the pregrooved side surface of the disk substrate, the pair of discs being bonded together with the respective recording layers inside.

(2) A 1.2±0.2 mm thick optical recording medium comprising: a transparent disc substrate of 120±3 mm or 80±3 mm in diameter and 0.6±0.1 mm in thickness, pregrooved at a track pitch of 0.6 to 0.9 µm; a recording layer containing the cyanine dye compound of formula (I), provided on the pregrooved side surface of the disk substrate; and a protective disc having substantially the same size as that of the substrate, bonded onto the recording layer.

In the above-described embodiments, a reflective layer is preferably provided on the recording layer. A protective layer may be provided on the reflective layer.

The optical recording medium of the invention is produced by, for example, the following process. The substrate is arbitrarily chosen from various materials used in conventional optical recording media, such as glass, polycarbonate resins, acrylic resins (e.g., polymethyl methacrylate), vinyl chloride resins (e.g., polyvinyl chloride and vinyl chloride copolymers), epoxy resins, and amorphous polyolefins or polyesters. If desired, these materials may be used as a combination thereof. These materials can be used in the form of a film or a rigid sheet. Preferred of the materials described above are polycarbonate resins for their moisture resistance, dimensional stability, and low cost.

If desired, an undercoat layer may be provided on the recording layer side of the substrate to improve flatness, to improve adhesion or to protect the recording layer. Materials of the undercoat layer includes polymers, such as polymethyl methacrylate, acrylic acid-methacrylic acid copolymers, styrene-maleic anhydride copolymers, polyvinyl alcohol, N-methylolacrylamide, styrene-vinyl toluene copolymers, chlorosulfonated polyethylene, nitrocellulose, polyvinyl chloride, chlorinated polyolefins, polyesters, polyimides, vinyl acetate-vinyl chloride copolymers, ethylene-vinyl acetate copolymers, polyethylene, polypropylene, and polycarbonate; and surface modifiers, such as silane coupling agents. The undercoat layer can be formed by applying a coating composition prepared by dissolving or dispersing the above-described material in an appropriate medium onto the substrate surface by spin coating, dip coating, extrusion coating or like coating techniques usually to a dry thickness of 0.005 to 20 µm, preferably 0.01 to 10 µm.

The substrate (or the undercoat layer) is usually pregrooved for tracking or representing information such as address signals. The pregrooves are preferably formed directly on the substrate in the step of injection molding or extrusion molding of a resin material, such as polycarbonate, in the preparation of the substrate. The pregrooves are generally made at a track pitch of 1.4 to 1.8 µm for CD-R type and 0.6 to 0.9 µm for DVD-R type.

The depth of the pregrooves preferably ranges from 30 to 200 nm with a preferred half-value width ranging from 0.2 to 0.9 µm. With the pregroove depth ranging between 150 and 200 nm, the sensitivity can be improved with almost no reduction in reflectance, which is particularly advantageous in the production of CD-R or DVD-R type optical recording media.

The recording layer can be formed by applying a coating composition, prepared by dissolving the cyanine dye compound of the invention and, if desired, a singlet oxygen quencher, a binder, etc. in a solvent, onto the substrate to form a coating film, followed by drying the coating film. Solvents which can be used to prepare the coating composition for forming the dye recording layer include esters, such as methyl lactate, ethyl lactate, butyl acetate, and cellosolve acetate; ketones, such as methyl ethyl ketone, cyclohexanone, and methyl isobutyl ketone; chlorinated hydrocarbons, such as dichloromethane, 1,2-dichloroethane, and chloroform; amides, such as dimethylformamide; hydrocarbons, such as cyclohexane; ethers, such as tetrahydrofuran, diethyl ether, and dioxane; alcohols, such as ethanol, n-propanol, isopropyl alcohol, n-butanol, and diacetone alcohol; fluorine-containing solvents, such as 2,2,3,3-tetrafluoropropanol; and glycol ethers, such as ethylene glycol monomethyl ether, ethylene glycol monoethyl ether, and propylene glycol monomethyl ether. These solvents may be used singly or as a combination or two or more thereof in consideration of the solubility of the compounds to be used. The coating composition may further contain additional additives, such as antioxidants, ultraviolet (UV) absorbers, plasticizers, and lubricants, according to the objective.

The binders which can be used include natural organic polymers, such as gelatin, cellulose derivatives, dextran, rosin, and natural rubber, and synthetic polymers including hydrocarbon resins, such as polyethylene, polypropylene, polystyrene, and polyisobutylene; vinyl resins, such as polyvinyl chloride, polyvinylidene chloride, vinyl chloride-vinyl acetate copolymers; acrylic resins, such as polymethyl acrylate and polymethyl methacrylate; polyvinyl alcohol; chlorinated polyethylene; epoxy resins; butyral resins; rubber derivatives; and initial condensates of a thermosetting resin such as phenol-formaldehyde resin. In using a binder in the recording layer, the binder is usually used in an amount of 0.01 to 50 times, preferably 0.1 to 5 times, the weight of the dye. The coating composition for the recording layer generally has a solid content of 0.01 to 10%, preferably 0.1 to 5%, by weight.

The coating method includes spraying, spin coating, dip coating, roll coating, blade coating, doctor roll coating, screen printing or like techniques. The recording layer may have a single or a multiple layer structure. The recording layer generally has a thickness of 20 to 500 nm, preferably 50 to 300 nm.

The reflective layer, which can be provided on the recording layer to improve the reflectance upon reading information, is made of light reflective substance having a high reflectance with respect to laser light. Such substances include metals or semimetals, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi; and stainless steel. Preferred of them are Cr, Ni, Pt, Cu, Ag, Au, Al, and stainless steel. They may be used individually or as a combination of two or more thereof. Two or more of them may be used in the form of their alloy. The reflective layer can be formed by, for example, vacuum evaporation, sputtering or ion plating of the above-described light reflective substance. The reflecting layer usually has a thickness of 10 to 300 nm, preferably 50 to 200 nm.

If desired, a protective layer may be provided on the reflective layer for affording physical or chemical protection to the recording layer, etc. A protective layer can also be provided on the opposite side of the substrate (i.e., the substrate surface on which no recording layer is to be formed) to improve scratch resistance and moisture resistance. Materials useful to form the protective layer include inorganic substances, such as $SiO$, $SiO_2$, $MgF_2$, $SnO_2$, and $Si_3N_4$; and organic substances, such as thermoplastic resins, thermosetting resins, and UV-curing resins. The protective layer can be formed by laminating the reflective layer and/or the substrate with, for example, a film obtained by extrusion processing of a plastic via an adhesive. Alternatively, the protective layer may be formed through vacuum evaporation, sputtering, spread coating, or like methods. In the case of a thermoplastic resin or a thermosetting resin, the protective layer can also be formed by applying a coating composition prepared by dissolving the resin in an appropriate solvent, followed by drying. In the case of an UV-curing resin, the protective layer can also be formed by applying the resin as such or as dissolved in an appropriate solvent, followed by curing by UV irradiation. The coating composition for the protective layer can contain various additives, such as antistatic agents, antioxidants, and UV absorbers, according to the objective. The protective layer usually has a thickness of 0.1 to 100 µm. Through these steps there is obtained a structure comprising the substrate and a stack of the recording layer, the reflective layer, and, if desired, the protective layer. Two structures thus prepared are bonded with an adhesive, with the recording layers inside relative to the respective substrates, to produce a DVD-R type optical recording medium having dual recording layers. The two structures can be bonded with a delayed UV-curing adhesive, a hot-melt adhesive, adhesive tape, etc. A delayed UV-curing adhesive is preferred from the standpoint of less damage to the dual recording layers and less cost. The adhesive is preferably of solventless type. The adhesive is applied by spraying, spin coating, roll coating, screen printing, and the like. Of these, screen printing is a preferred application process. Alternatively, the structure comprising the substrate and a stack of layers can also be bonded with a protective disc having substantially the same size as that of the substrate with an adhesive, with the recording layer inside relative to the substrate, to produce a DVD-R type optical recording medium having a recording layer on one side thereof.

Writing to the recording medium according to the invention can be carried out, for example, as follows. The recording medium is irradiated with a writing laser beam, such as a semiconductor laser beam, from the substrate side while spinning the medium at a constant linear velocity (1.2 to 14 m/sec in the case of CD format) or a constant angle velocity. It is presumed that on being irradiated, voids are formed in the interface between the recording layer and the reflective layer (void formation accompanies deformation of the recording layer and/or the reflective layer), or the substrate is deformed, or the recording layer undergoes such changes as discoloration or association, which results in a change of the reflectance of the recording layer to record information. The writing laser light is usually a semiconductor laser beam having a wavelength between 750 nm and 850 nm, preferably between 770 nm and 790 nm, for CD-R and a semiconductor laser beam having a wavelength between 600 nm and 700 nm, preferably between 620 nm and 680 nm, particularly preferably 630 to 670 nm, for DVD-R. The recorded information is read by irradiating the medium with a semiconductor laser beam having the same wavelength as used for writing from the substrate side while spinning the medium at the same constant linear velocity as used for writing and detecting the reflected light.

The present invention will now be illustrated in greater detail with reference to the following Examples, but the invention should not be construed as being limited thereto.

EXAMPLE 1

A polycarbonate resin was injection molded by use of an injection molding machine supplied by Sumitomo Heavy Industries, Ltd. into a substrate 0.6 mm in thickness and 120 mm in diameter having a spiral pregroove 150 nm deep, 290 mm wide with a track pitch of 0.74 µm. A coating composition prepared by dissolving 2.0 g of cyanine dye compound No. I-1 in 100 ml of 2,2,3,3-tetrafluoropropanol was applied to the pregrooved side of the substrate by spin coating to form a 80 nm thick dye layer. Silver was sputtered onto the dye layer to a deposit thickness of about 150 nm to form a reflective layer. A UV-curing resin Daicure Clear SD-318, available from Dainippon Ink & Chemicals, Inc. was applied to the reflective layer by spin coating and UV-cured with a metal halide lamp to form a protective layer having a thickness of about 7 µm. The resulting disc, designated disc A, had a thickness of 0.6 mm. Separately, silver was sputtered on another substrate (with no dye layer) to form a protective layer to prepare a 0.6 mm thick disc with no dye layer, designated disc B.

A delayed curing cationically polymerizable adhesive SK7000, available from Sony Chemicals Corp., was applied to the protective layer of disc A and that of disc B by screen printing (screen mesh size: 300 mesh). The coating layer were irradiated with ultraviolet rays from a metal halide lamp, and immediately thereafter the two discs were joined with their protective layer sides inside and pressed from both sides. After about 5 minute standing, the adhesive cured completely to provide a 1.2 mm thick disc having dual recording layers.

EXAMPLES 2 TO 8

Discs were prepared in the same manner as in Example 1, except for replacing cyanine dye compound No. I-1 with each of the cyanine dye compounds shown in Table 2 below.

Comparative Example 1

A disc was prepared in the same manner as in Example 1, except that a coating composition prepared by dissolving 2.0 g of comparative cyanine dye (A) shown below in 100 ml of 2,2,3,3-tetrafluoropropanol was used to form a recording layer (thickness: 80 nm).
Comparative Cyanine dye (A) (Specific Example (Chemical Formula 10) according to JP-A-10-181211):

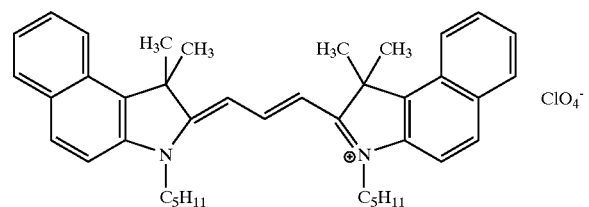

Evaluation
1) Performance as Optical Disc:

EFM signals of 3T and 14T were recorded on each of the DVD-Rs of Examples and Comparative Example by use of an optical disc testing drive DDU1000, supplied by Pulstec Industrial Co., Ltd., at a laser beam wavelength of 655 nm (pickup Na=0.6), a constant linear velocity of 3.49 m/s, and a write power of 9 mW. The recorded signals were reproduced with a laser beam of the same wavelength as the write beam at a power of 0.5 mW, and the degree of modulation and jitter were measured for the 3T signals and 14T signals.
2) Light Resistance:

The optical discs of the Examples and Comparative Example were exposed to light of a xenon lamp (170,000 lux) for 48 hours and then tested in the same manner as described above.

The results of the evaluation are shown in Table 2.

TABLE 2

| Dye Compound | Recording/ Reproduction Characteristics (Before Xe Lamp Exposure) | | | Recording/ Reproduction Characteristics (After Xe Lamp Exposure) | | |
|---|---|---|---|---|---|---|
| | 3T | 14T | Jitter | 3T | 14T | Jitter |
| Ex. 1 I-1 | 25 | 65 | 7.2 | 23 | 68 | 7.4 |
| Ex. 2 I-8 | 24 | 64 | 7.4 | 25 | 66 | 7.5 |
| Ex. 3 I-21 | 25 | 68 | 7.4 | 25 | 69 | 7.4 |
| Ex. 4 I-37 | 25 | 67 | 7.1 | 29 | 70 | 7.5 |
| Ex. 5 I-62 | 25 | 70 | 7.4 | 25 | 72 | 7.7 |
| Ex. 6 I-89 | 28 | 66 | 7.2 | 26 | 68 | 7.6 |
| Ex. 7 I-99 | 26 | 69 | 7.0 | 24 | 69 | 7.4 |
| Ex. 8 I-103 | 23 | 63 | 7.1 | 28 | 65 | 7.9 |
| Comp. Ex. 1 Dye A | 20 | 62 | 9.2 | 27 | 79 | >20 |

The results in Table 2 prove that the DVD-R type optical discs of Examples 1 to 8 exhibit excellent recording and reproduction characteristics, having high degrees of modulation and low jitter values. The disc of Comparative Example 1 has a jitter value as high as 8% or more, failing to exhibit satisfactory recording and reproduction characteristics. Even after the light resistance testing, the discs of the present invention retained satisfactory recording and reproduction characteristics, indicating excellent light resistance, whereas the comparative disc underwent deterioration by light to increase the jitter to 20%.

The use of the cyanine dye compound of the present invention having a specific structure provides DVD-R type recording media which realizes a high degree of modulation and low jitter, particularly superiority in light resistance to conventional recording media.

While the invention has been described in detail and with reference to the specific embodiments thereof, it will be apparent to those skilled in the art that various changes and modifications can be made therein without departing from the spirit and the scope thereof.

What is claimed is:

1. A cyanine dye compound represented by formula (I):

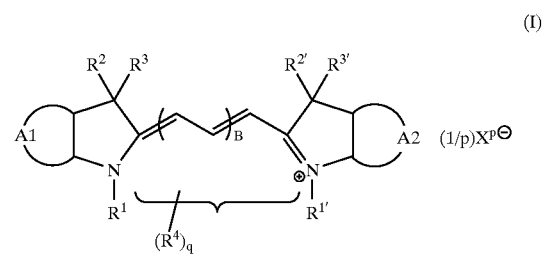

wherein A1 and A2 each independently represent a benzene ring or a naphthalene ring; $R^1$, $R^{1'}$, $R^2$, $R^{2'}$, $R^3$ and $R^{3'}$ each independently represent a substituted or unsubstituted alkyl group, provided that at least one of $R^1$ and $R^{1'}$ represents an alkyl group substituted with a hydroxyl group or an alkoxyl group having 1 to 6 carbon atoms; $R^4$ represents a substituent on the methine chain; q represents an integer of 0 or greater; p represents an integer of 1 to 4; B represents 0, 1 or 2; and $X^{p-}$ represents a p-valent anionic tetracyanoquinodimethane compound represented by formula (II):

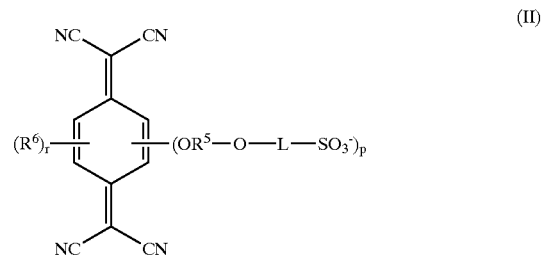

wherein $R^5$ represents a substituted or unsubstituted alkylene group; L represents a single bond or a divalent linking group; $R^6$ represents a substituent; p is as defined above; and r is an integer of 0 to 3.

2. The cyanine dye compound according to claim 1, wherein, in formula (II), $R^5$ is an alkylene group having 1 to 6 carbon atoms, p is 1 or 2, r is 0, and L is a single bond or —C(=O)—G— (wherein G is an alkylene, arylene or alkenylene group).

3. An optical recording medium comprising a substrate having provided thereon a recording layer capable of recording information by laser irradiation, wherein said recording layer contains a cyanine dye compound represented by formula (I):

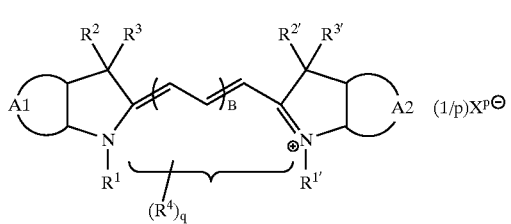 (I)

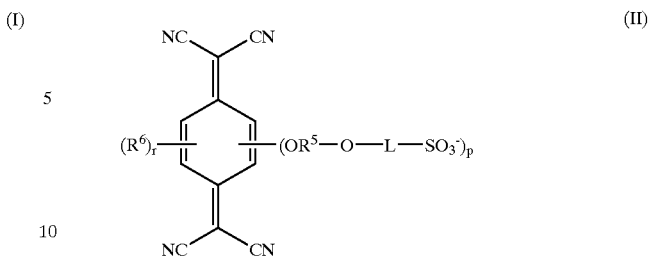 (II)

wherein A1 and A2 each independently represent a benzene ring or a naphthalene ring; $R^1$, $R^{1'}$, $R^2$, $R^{2'}$, $R^3$ and $R^{3'}$ each independently represent a substituted or unsubstituted alkyl group, provided that at least one of $R^1$ and $R^{1'}$ represents an alkyl group substituted with a hydroxyl group or an alkoxyl group having 1 to 6 carbon atoms; $R^4$ represents a substituent on the methine chain; q represents an integer of 0 or greater; p represents an integer of 1 to 4; B represents 0, 1 or 2; and $X^{p-}$ represents a p-valent anionic tetracyanoquinodimethane compound represented by formula (II):

wherein $R^5$ represents a substituted or unsubstituted alkylene group; L represents a single bond or a divalent linking group; $R^6$ represents a substituent; p is as defined above; and r is an integer of 0 to 3.

4. The optical recording medium according to claim 3, wherein, in formula (II), $R^5$ is an alkylene group having 1 to 6 carbon atoms, p is 1 or 2, r is 0, and L is a single bond or —C(=O)—G— (wherein G is an alkylene, arylene or alkenylene group).

* * * * *